Feb. 16, 1926.

F. T. ROBERTS 1,573,577

METHOD AND APPARATUS FOR MAKING FLUSH TANK BULBS

Filed March 15, 1924

INVENTOR
Fred Thomas Roberts
By Bair & Macklin,
ATTORNEYS

Patented Feb. 16, 1926.

1,573,577

UNITED STATES PATENT OFFICE.

FRED THOMAS ROBERTS, OF YONKERS, NEW YORK, ASSIGNOR TO PARAMOUNT RUBBER CONSOLIDATED, INC., OF TUCKAHOE, NEW YORK, A CORPORATION OF DELAWARE.

METHOD AND APPARATUS FOR MAKING FLUSH-TANK BULBS.

Application filed March 15, 1924. Serial No. 699,416.

*To all whom it may concern:*

Be it known that I, FRED THOMAS ROBERTS, a citizen of the United States, residing at Yonkers, in the county of Westchester and State of New York, have invented a certain new and useful Improvement in a Method and Apparatus for Making Flush-Tank Bulbs, of which the following is a full, clear, and exact description, reference being had to the accompanying drawings.

This invention relates to the manufacture of such hollow rubber articles as carry attaching devices, for instance, flush tank bulbs. More specifically the invention is concerned with the manufacture of double-ended flush tank bulbs provided with attaching spuds at its opposite ends and adapted to seat either end downward. In the manufacture of such bulbs, it is important to hold the spuds accurately in position. This is particularly difficult in the case of the downwardly facing upper mold.

It is one of the objects of the present invention to provided for accurately and readily positioning the spud in the forming or vulcanizing mold or both, and readily attaching the same with reinforcing material to the body of the bulb. Means for carrying out this object will be hereinafter more fully explained and the essential characteristics of the invention will be summarized in the claims.

Figure 1:
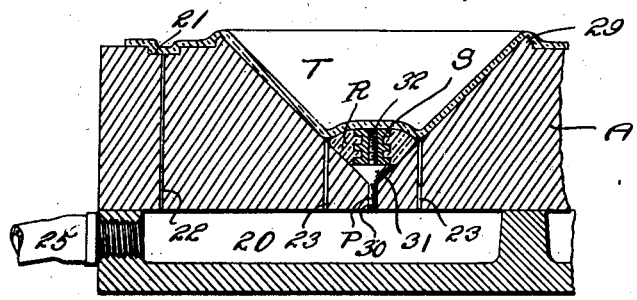
Figure 2:
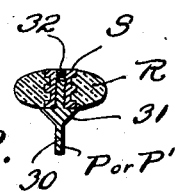
Figure 3:
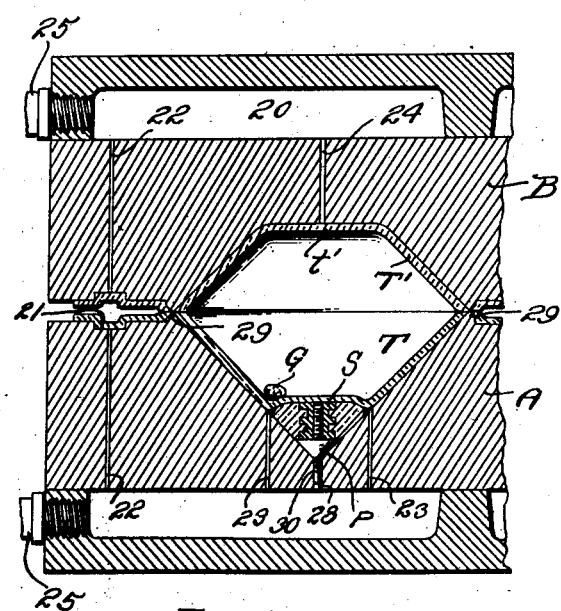
Figure 4:
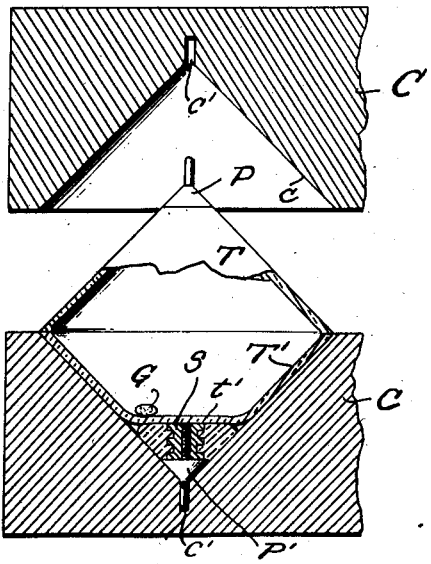
Figure 5:
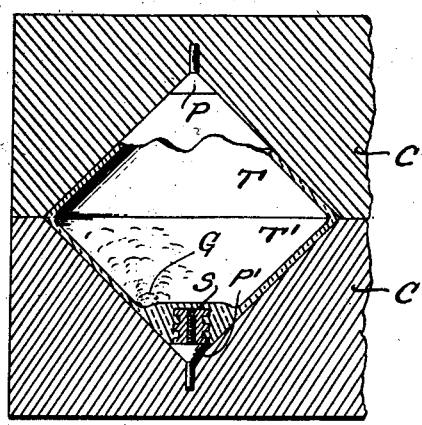

In the drawing, Fig. 1 is a vertical section through a portion of a forming mold section; Fig. 2 is a detail illustrating the spud with its reinforcing rubber and carrying pn; Fig. 3 is a cross section through two forming mold members brought together; Fig. 4 is a section of the vulcanizing mold separated, with the unvulcanized biscuit just placed therein; Fig. 5 is a similar view of the vulcanizing mold at the completion of the vulcanization.

The double ended flush tank bulb illustrated herein is claimed in a copending application of mine No. 699,355, filed March 14, 1924. That application shows a different method of making the article but contains broad claims to the features common to that method and the present method.

Referring first to Figs. 1 and 2, A indicates the lower forming mold section and B the upper mold section. These mold members are provided with cooperating cavities which are arranged to be brought together in any suitable manner so as to effect registration of the opposing cavities. Each section has a suction compartment 20 in its base and a border groove 21 in its face surrounding all of the cavities. These grooves are connected with the section chamber by passageways 22. Two or more passageways 23 connect the chamber of the lower section with the forming cavity, while a single passageway 24 is shown as connecting the suction chamber 20 of the section B with the mold cavity. The two suction chambers are coupled with suitable conduits 25 leading to the vacuum pump, not shown.

In each of the views, I have indicated at S a metallic spud of standard type, which is to be embedded in the bulb. As shown in Fig. 2, this spud is in the first instance mounted on a pin P. This pin has a grooved cylindrical shank 30 and is shown as having a conical enlargement 31 and an externally threaded extension 32 which screws into the bore of the spud. This view shows the spud surrounded by a rubber reinforce R, which is a piece of raw rubber of approximately lenticular shape.

In manufacturing the flush tank bulb by the present invention, I locate one of the spuds in the bottom of the cavity in the lower forming mold A. This cavity is provided with an opening 28 (Fig. 3) and in this opening I place the shank 30 of the pin P which carries the spud surrounded by the rubber reinforce as shown in Fig. 2. The particular mold shown is designed to make a double conical bulb and hence the cavity referred to is conical, and the conical enlargement 31 on the pin fills the portion of the cavity below the spud.

I now place a sheet of raw rubber across the mold and exhaust the air from the chamber 20. This binds the margin of the rubber at the vacuum border groove, as indicated at 21 in Fig. 1, and causes the rubber which was over the mouth of the form cavity to sink thereinto as shown at T. The suction passageways 23 terminate beyond the edge of the reinforce R but adjacent thereto. The cylindrical bore 28 is also loose enough to allow the exit of the air. Accordingly the rubber sheet seats snugly along the face of the mold cavity and across the top of the spud and reinforce and at the same time the air is exhausted between the reinforce and rubber sheet and between the reinforce and the mold. The parts now have the position shown in Fig. 1.

I now take the mold section B and apply the rubber sheet to its under surface (or to its top surface if it be inverted) and exhaust the air from the cavity. This cavity is preferably of a truncating conical form, as shown, so that the rubber as seated therein takes the form shown at $T^1$ in Fig. 3. I place in the lower lined cavity a tablet G of material adapted to generate gas when heated, and then I bring the two mold members together, with the result that annular cutting edges 29 thereof about the mold cavities come together, cutting through the rubber and cutting out the biscuit, and at the same time forming an effective peripheral seam.

Following the forming operation, above described, the completed biscuit flattened on the upper side and carrying the reinforcing spud and pin on the under side, is removed from the forming mold, ready for transference to the vulcanizing mold.

The vulcanizing mold is indicated at C and C in Figs. 4 and 5, the two sections of this mold being identical, and each being provided with a conical cavity $c$ terminating in a hole $c^1$ adapted to receive the pin shank 30. Before placing the biscuit in the mold, I locate a spud in the lower mold. Thus I take a reinforced and pinned spud as shown in Fig. 2 and place the pin shank in the mold cavity $c^1$ of the lower mold, as indicated at $P^1$ in Fig. 4.

I now invert the biscuit and place its flattened face $t^1$ against the inserted reinforcing spud, leaving the reinforced spud and pin P which are attached, projecting upwardly. Then I bring the vulcanizing molds together and supply the requisite heat to gasify the enclosed substance and vulcanize the article with the internal pressure provided by the gas. This gives the article the form shown in Fig. 5 wherein both spuds are finally imbedded in the reinforced polar regions of the article and upon separation of the mold, the article is completed and it is only necessary to unscrew the two pins P and $P^1$.

While I have shown the bulb as substantially of double conical shape, it is to be understood that it may be of other shape, if desired, and if so, the shape of the head or the enlargement 31 on the pin may be changed to conform to the general shape of the mold cavity.

I claim:

1. The method of making rubber articles, having attaching devices, comprising surrounding the attaching device with a mass of rubber, placing it in a forming mold, pneumatically seating sheet rubber stock against the mass of rubber, then uniting such stock with other stock to form a hollow biscuit, then transferring such biscuit with the externally applied reinforcing to a vulcanizing mold and vulcanizing the article as a unit.

2. The method of making flush tank bulbs comprising placing a spud in a mold cavity, surrounding the spud with a mass of rubber, bringing a sheet of rubber stock into engagement with the walls of the cavity and with the mass of rubber so as to form one portion of the article, uniting this with another portion of the article and then vulcanizing the article.

3. The method of making flush tank bulbs comprising the positioning of a spud in the cavity of a forming mold section, surrounding such spud with a mass of raw rubber, placing a sheet of raw rubber over the mouth of the cavity pneumatically forcing such sheet into engagement with the mass of rubber and with the wall of the cavity and then bringing the seated sheet into engagement with other rubber stock and cutting around the junction to form a completed biscuit.

4. The method of making flush tank bulbs comprising the positioning of a spud in the cavity of a forming mold section, surrounding such spud with a mass of rubber, bringing a sheet of raw rubber stock into engagement with such mass of rubber by suction, placing in the rubber-lined cavity a substance which when heated is adapted to yield a permanent gas, and then bringing the seated stock into engagement with other stock and thereafter vulcanizing the article by heat.

5. The method of making hollow rubber articles, having a plurality of attaching devices, comprising securing one of the devices to the biscuit in the forming operation and securing another of the devices in the vulcanizing operation.

6. The method of making hollow rubber articles, having two attaching devices, comprising of forming a hollow biscuit with one attaching device in place, placing in a vulcanizing mold an attaching device embraced by a mass of rubber, placing the biscuit in the vulcanizing mold so that the two attaching devices are at opposite ends of the biscuit and vulcanizing the article with an internal fluid pressure.

7. The method of making double-ended flush tank bulbs, comprising forming a biscuit with one attached spud and placing such biscuit in a vulcanizing mold which has been equipped with the other spud and vulcanizing the article as a unit with internal fluid pressure to cause the spuds to become firmly affixed at the opposite ends of the article.

8. The method of making double-ended flush tank bulbs, comprising forming the biscuit with one spud attached to its exterior at one end and the opposite end substantially flat and attaching another spud to such opposite end during the vulcanizing operation.

9. The method of making double-ended flush tank bulbs, consisting of forming a biscuit with an external spud reinforced and attached at one end of the biscuit, the opposite end being substantially flat, and then placing such biscuit in a vulcanizing mold with a spud having a surrounding reinforce so that the latter spud is adjacent said flattened face, and vulcanizing the article as a unit.

10. The method of making double-ended flush tank bulbs, comprising placing in a forming mold, a spud surrounded by a mass of rubber, forming a hollow biscuit adjoining such a mass of rubber, placing in a vulcanizing mold a spur surrounded by a mass of rubber, placing in such vulcanizing mold the biscuit formed as described with its spud away from the spud in the vulcanizing mold, then closing the vulcanizing mold, and vulcanizing the article with both spuds in place.

11. The method of making double-ended flush tank bulbs and similar articles, consisting of placing a pin carrying a spud in a forming mold, forming the biscuit with such spud attached to its exterior, placing a pin carrying a spud in a vulcanizing mold, placing the biscuit with an unspudded face adjacent to the spud in the vulcanizing mold and vulcanizing the article as a unit.

12. The method of making double-ended flush tank bulbs, consisting of placing in a lower forming mold a pin carrying a spud, pneumatically seating rubber stock over the upper end of the spud, joining such stock to other seated rubber stock, having a flattened central region, inverting the biscuit so formed and placing it in a lower vulcanizing mold which carries a pin having a spud, bringing into conjunction with such lower mold an upper mold which has a cavity to receive the upwardly projecting pin.

13. In an apparatus for making flush tank bulbs, the combination of a mold member having a cavity and a bore leading therefrom, and a pin having a shank adapted to occupy such bore, and having an enlargement conforming to the adjacent shape of the cavity and a shank beyond the enlargement adapted to carry an attaching device.

14. In an apparatus for making flush tank bulbs, the combination of a mold member having a cavity and a bore leading therefrom, and a pin having a shank adapted to occupy such bore loosely, said pin having an enlargement conforming to the adjacent shape of the cavity and a threaded shank beyond the enlargement adapted to carry an internally threaded spud.

15. The method of making double-ended flush tank bulbs and similar articles, consisting of placing in a forming mold, a loose pin on which is threaded a spud surrounded by a rubber reinforce, forming the biscuit with such spud attached to its exterior and with a gas generation placing in a vulcanizing mold, a similar pin, spud and reinforce, placing the biscuit with its unspudded face adjacent to the spud in the vulcanizing mold and vulcanizing the article by heat.

16. An apparatus for making flush tank bulbs comprising a forming mold having a cavity and a pin for carrying a spud, said pin having an enlargement beyond the spud conforming to the shape of the cavity.

17. An apparatus for making flush tank bulbs consisting of a mold having a cavity with a recess at the base of the cavity, a pin for carrying a spud, said pin having an extension adapted to be mounted in said recess and having an enlargement between the extension of the spud carrying portion.

18. An apparatus for making flush tank bulbs consisting of a mold having a cavity with a recess at the base of the cavity, a pin having an extension adapted to occupy said recess, an enlargement adjacent the extension conforming to the shape of the cavity and a screw-threaded portion beyond the enlargement adapted to carry the spud.

In testimony whereof, I hereunto affix my signature.

FRED THOMAS ROBERTS.